(12) United States Patent
Herman et al.

(10) Patent No.: US 12,162,497 B2
(45) Date of Patent: Dec. 10, 2024

(54) VEHICLE SENSOR OCCLUSION DETECTION

(71) Applicant: Ford Global Technologies, LLC, Dearborn, MI (US)

(72) Inventors: David Michael Herman, Oak Park, MI (US); Aaron Lesky, Ypsilanti, MI (US); Akshat Rajvanshi, Novi, MI (US); Brian Quinn Kettlewell, Cambridge (CA); Geoffrey Horowitz, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 471 days.

(21) Appl. No.: 17/517,855

(22) Filed: Nov. 3, 2021

(65) Prior Publication Data
US 2023/0134302 A1    May 4, 2023

(51) Int. Cl.
*G06K 9/00* (2022.01)
*B60W 40/06* (2012.01)
*G01J 4/04* (2006.01)
*G06V 10/143* (2022.01)
*G06V 10/44* (2022.01)
*G06V 20/56* (2022.01)
(Continued)

(52) U.S. Cl.
CPC ............... *B60W 40/06* (2013.01); *G01J 4/04* (2013.01); *G06V 10/143* (2022.01); *G06V 10/44* (2022.01); *G06V 20/56* (2022.01); *G06V 30/274* (2022.01); *B60W 10/04* (2013.01); *B60W 10/18* (2013.01); *B60W 10/20* (2013.01); *B60W 30/143* (2013.01); *B60W 2420/403* (2013.01); *B60W 2420/408* (2024.01); *B60W 2552/53* (2020.02)

(58) Field of Classification Search
None
See application file for complete search history.

(56) References Cited

U.S. PATENT DOCUMENTS

| 5,130,794 A  | 7/1992 | Ritchey |
| 8,941,739 B2 | 1/2015 | Yoo |

(Continued)

FOREIGN PATENT DOCUMENTS

WO    2020242945 A1    12/2020

OTHER PUBLICATIONS

Richey, et al., "Creating and Analyzing a Mirage," The Physics Teacher, vol. 44, Oct. 2006, 6 pages.
(Continued)

*Primary Examiner* — Wei Wen Yang
(74) *Attorney, Agent, or Firm* — Frank A. MacKenzie; Bejin Bieneman PLC (57) ABSTRACT

A system for detecting a road surface includes a processor programmed to identify, in a vehicle sensor field of view, environment features including a sky, a road surface, a road shoulder, based on map data and data received from the one or more vehicle sensors, upon determining a low confidence in identifying an area of the field of view to be a road surface or sky, to receive a polarimetric image, and to determine, based on the received polarimetric image, whether the identified area is a mirage phenomenon, a wet road surface, or the sky. The low confidence is determined upon determining that a road surface has a vanishing edge, a road lane marker is missing, or an anomalous object is present.

20 Claims, 5 Drawing Sheets

(51) Int. Cl.
    *G06V 30/262*     (2022.01)
    *B60W 10/04*     (2006.01)
    *B60W 10/18*     (2012.01)
    *B60W 10/20*     (2006.01)
    *B60W 30/14*     (2006.01)

(56) References Cited

U.S. PATENT DOCUMENTS

| | | | |
|---|---|---|---|
| 10,203,210 B1 | 2/2019 | Tagawa | |
| 10,296,795 B2 * | 5/2019 | Kwant | G05D 1/0246 |
| 10,360,459 B2 | 7/2019 | Itoh et al. | |
| 2018/0005012 A1 * | 1/2018 | Aycock | G01J 4/04 |
| 2022/0410881 A1 * | 12/2022 | Young | B60W 30/095 |

OTHER PUBLICATIONS

Verma, H. C., "*Developing equations of light path in Mirage-like situations," www.hcverma.in, 2016, 11 pages.
"Hive Enterprise Solutions," www.thehive.ai, Mar. 2021, 8 pages.
"Mirage," Wikipedia, Mar. 2021, 5 pages.
"What is the path of the blended light beam in a mirage?" Physics Stack Exchange, 2018, 4 pages.
Webanck, A., "Génération procédurale d'effets atmosphériques," HAL, Université de Lyon, 2019, 164 pages.
Horath, G., et al., "Why are Water-Seeking Insects Not Attracted by Mirages," ResearchGate, 1997, 8 pages.

\* cited by examiner

VEHICLE SENSOR OCCLUSION DETECTION

BACKGROUND

Vehicles can be equipped with various types of object detection sensors in order to detect objects in an area surrounding the vehicle. Vehicle computers can control various vehicle operations based on data received from the sensors. Weather conditions such as rain or high ambient temperature may affect sensor data.

DETAILED DESCRIPTION

Introduction

Disclosed herein is a system for detecting a road surface, comprising a processor and a memory, the memory storing instructions executable by the processor to identify, in a vehicle sensor field of view, environment features including a sky, a road surface, a road shoulder, based on map data and data received from the one or more vehicle sensors, upon determining a low confidence in identifying an area of the field of view to be a road surface or sky, to receive a polarimetric image, and to determine, based on the received polarimetric image, whether the identified area is a mirage phenomenon, a wet road surface, or the sky. The low confidence is determined upon determining that a road surface has a vanishing edge, a road lane marker is missing, or an anomalous object is present.

The instructions may further include instructions to determine the mirage phenomenon based on environmental conditions including a temperature and an atmospheric condition.

The instructions may further include instructions to identify the environment features using semantic segmentation.

The anomalous object may include at least one of a mirrored vehicle or an object with a distorted shape.

The instructions may further include instructions to determine the mirage phenomenon upon determining (i) the area of the field of view, based on semantic segmentation, to be a sky portion, (ii) the area, based on image features, to be a road surface, (iii) the area, based on localization based on map data and vehicle sensor data, to be a road surface, (iv) the area, based on the received polarimetric image, to be a sky portion, and (v) a probability of atmospheric condition for mirage phenomenon that exceeds a probability threshold.

The instructions may further include instructions to determine an occluded volume in the field of view upon detecting the mirage phenomenon, and actuate a vehicle actuator based on the determined occluded volume.

The instructions may further include instructions to actuate the vehicle actuator based on a distance of the vehicle to the occluded volume.

The instructions may further include instructions to determine, based on the received polarimetric image, at least one of: (i) a road surface upon detecting a low to moderate degree of polarization and a direction of polarization matching a road surface polarization direction, (ii) a sky portion upon detecting a low degree of polarization and a direction of polarization matching a skydome prediction of sky, or (iii) a water area upon detecting a high degree of polarization and a direction of polarization matching water direction of polarization.

The instructions may further include instructions to determine a water area upon detecting a high degree of polarization and a direction of polarization matching water direction of polarization, and actuate a vehicle actuator based on the determined water area.

The instructions may further include instructions, upon determining the water area on a vehicle path, to actuate the vehicle actuator based on a distance of the vehicle to the water area.

Further disclosed herein is a method, comprising identifying, in a vehicle sensor field of view, environment features including a sky, a road surface, a road shoulder, based on map data and data received from the one or more vehicle sensors, upon determining a low confidence in identifying an area of the field of view to be a road surface or sky, receiving a polarimetric image, and determining, based on the received polarimetric image, whether the identified area is a mirage phenomenon, a wet road surface, or the sky, wherein the low confidence is determined upon determining that a road surface has a vanishing edge, a road lane marker is missing, or an anomalous object is present.

The method may further include determining the mirage phenomenon based on environmental conditions including a temperature and an atmospheric condition.

The method may further include identifying the environment features using semantic segmentation.

The anomalous object may include at least one of a mirrored vehicle or an object with a distorted shape.

The method may further include determining the mirage phenomenon upon determining (i) the area of the field of view, based on semantic segmentation, to be a sky portion, (ii) the area, based on image features, to be a road surface, (iii) the area, based on localization based on map data and vehicle sensor data, to be a road surface, (iv) the area, based on the received polarimetric image, to be a sky portion, and (v) a probability of atmospheric condition for mirage phenomenon that exceeds a probability threshold.

The method may further include determining an occluded volume in the field of view upon detecting the mirage phenomenon, and actuate a vehicle actuator based on the determined occluded volume.

The method may further include actuating the vehicle actuator based on a distance of the vehicle to the occluded volume.

The method may further include determining, based on the received polarimetric image, at least one of: (i) a road surface upon detecting a low to moderate degree of polarization and a direction of polarization matching a road surface polarization direction, (ii) a sky portion upon detecting a low degree of polarization and a direction of polarization matching a skydome prediction of sky, or (iii) a water area upon detecting a high degree of polarization and a direction of polarization matching water direction of polarization.

The method may further include determining a water area upon detecting a high degree of polarization and a direction of polarization matching water direction of polarization, and actuating a vehicle actuator based on the determined water area.

The method may further include, upon determining the water area on a vehicle path, actuating the vehicle actuator based on a distance of the vehicle to the water area.

Further disclosed is a computing device programmed to execute any of the above method steps.

Yet further disclosed is a computer program product, comprising a computer readable medium storing instructions executable by a computer processor, to execute any of the above method steps.

System Elements

A vehicle computer may be programmed to detect physical phenomena or features such as objects, road surfaces, etc., based on camera sensor data and to operate the vehicle based on detected phenomena. However, environmental conditions such as a temperature gradient above a road surface may cause a mirage phenomenon resulting in misdetection of objects. A mirage may result in misdetection of water on a road surface or the presence of an object on the road surface. An example system is disclosed herein to identify environment features such as a portion of the sky, a road surface, a road shoulder, etc., based on map data and data received from vehicle sensors, then upon determining a low confidence in identifying an area to be a road surface or sky, receive a polarimetric image, and to determine, based on the received polarimetric image, data about the identified area, typically whether the identified area is a mirage phenomenon, a wet road surface, or the sky. A low confidence can be determined upon determining that a road surface has a vanishing edge, a road lane marker is missing, or an anomalous object is present.

Figure 1:
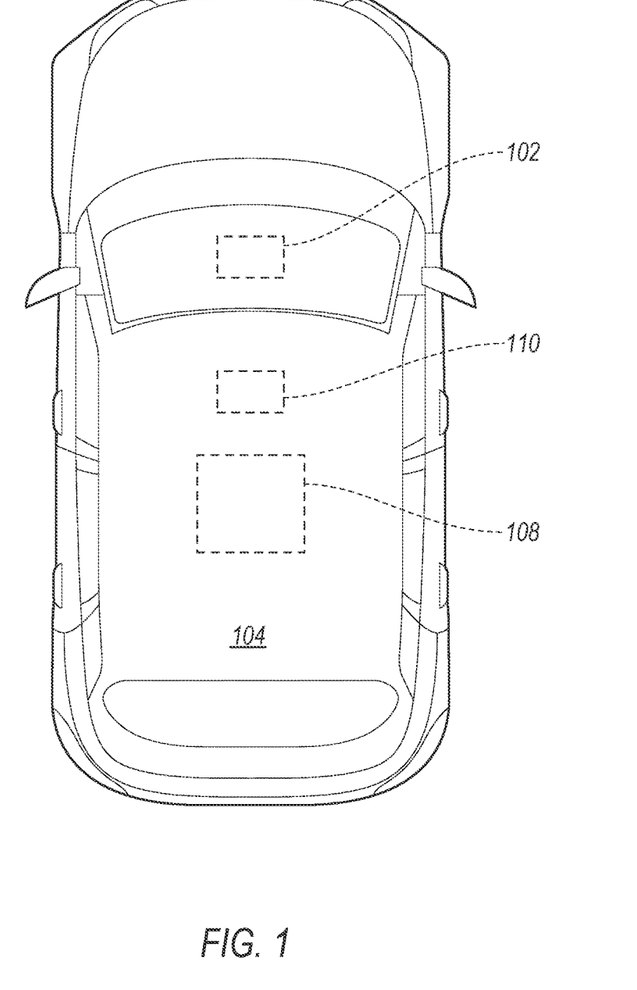
FIG. 1 shows an example vehicle.

With reference to FIG. 1, a vehicle 104 may be any suitable type of ground vehicle 104, e.g., a passenger or commercial automobile such as a sedan, a coupe, a truck, a sport utility, a crossover, a van, a minivan, a taxi, a bus, etc.

A vehicle 104 includes one or more computers 108. A computer 108 includes a processor and a memory. The memory includes one or more forms of computer 108 readable media, and stores instructions executable by the vehicle 104 computer 108 for performing various operations, including as disclosed herein. For example, the computer 108 can be a generic computer 108 with a processor and memory as described above and/or may include an electronic control unit ECU or controller for a specific function or set of functions, and/or a dedicated electronic circuit including an ASIC that is manufactured for a particular operation, e.g., an ASIC for processing sensor 102 data and/or communicating the sensor 102 data. In another example, computer 108 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 108.

The memory can be of any type, e.g., hard disk drives, solid-state drives, servers, or any volatile or non-volatile media. The memory can store the collected data sent from the sensors 102. The memory can be a separate device from the computer 108, and the computer 108 can retrieve information stored by the memory via a network in the vehicle 104, e.g., over a CAN bus, a wireless network, etc. Alternatively or additionally, the memory can be part of the computer 108, e.g., as a memory of the computer 108.

The computer 108 may include programming to operate one or more of vehicle 104 brakes, propulsion e.g., control of acceleration in the vehicle 104 by controlling one or more of an internal combustion engine, electric motor, hybrid engine, etc., steering, climate control, interior and/or exterior lights, etc., as well as to determine whether and when the computer 108, as opposed to a human operator, is to control such operations. Additionally, the computer 108 may be programmed to determine whether and when a human operator is to control such operations. The computer 108 may include or be communicatively coupled to, e.g., via a vehicle 104 network such as a communications bus as described further below, more than one processor, e.g., included in components such as sensors 102, electronic control units (ECUs) or the like included in the vehicle 104 for monitoring and/or controlling various vehicle components, e.g., a powertrain controller, a brake controller, a steering controller, etc.

The computer 108 is generally arranged for communications on a vehicle 104 communication network that can include a bus in the vehicle 104 such as a controller area 106 network CAN or the like, and/or other wired and/or wireless mechanisms. Alternatively or additionally, in cases where the computer 108 actually comprises a plurality of devices, the vehicle 104 communication network may be used for communications between devices represented as the computer 108 in this disclosure. Further, as mentioned below, various controllers and/or sensors 102 may provide data to the computer 108 via the vehicle 104 communication network.

A vehicle 104, such as autonomous or semi-autonomous vehicle 104, typically includes a variety of sensors 102. A sensor 102 is a device that can obtain one or more measurements of one or more physical phenomena. Some sensors 102 detect internal states of the vehicle 104, for example, wheel speed, wheel orientation, and engine and transmission variables. Some sensors 102 detect the position or orientation of the vehicle 104, for example, global positioning system GPS sensors 102; accelerometers such as piezo-electric or microelectromechanical systems MEMS; gyroscopes such as rate, ring laser, or fiber-optic gyroscopes; inertial measurements units IMU; and magnetometers. Some sensors 102 detect the external world, for example, radar sensors 102, scanning laser range finders, light detection and ranging LIDAR devices, and image processing sensors 102 such as cameras. A LIDAR device detects distances to objects by emitting laser pulses and measuring the time of flight for the pulse to travel to the object and back. A camera sensor 102 may incorporate a filter or filter array to restrict the passage of light, in transmission or reception, based on a property of the light such as wavelength, polarization, or light field. Some sensors 102 are communications devices, for example, vehicle-to-infrastructure V2I or vehicle-to-vehicle V2V devices.

Sensor 102 operation can be affected by obstructions, e.g., dust, snow, insects, etc. Often, but not necessarily, a sensor 102 includes a digital-to-analog converter to converted sensed analog data to a digital signal that can be provided to a digital computer 108, e.g., via a network. Sensors 102 can include a variety of devices, and can be disposed to sense and environment, provide data about a machine, etc., in a variety of ways. For example, a sensor 102 could be mounted to a stationary infrastructure element on, over, or near a road 100. Moreover, various controllers in a vehicle 104 may operate as sensors 102 to provide data via the vehicle 104 network or bus, e.g., data relating to vehicle 104 speed, acceleration, location, subsystem and/or component status, etc. Further, other sensors 102, in or on a vehicle 104, stationary infrastructure element, etc., infrastructure could include cameras, short-range radar, long-range radar, LIDAR, and/or ultrasonic transducers, weight sensors 102, accelerometers, motion detectors, etc., i.e., sensors 102 to provide a variety of data. To provide just a few non-limiting examples, sensor 102 data could include data for determining a position of a component, a location of an object, a speed of an object, a type of an object, a slope of a roadway, a temperature, an presence or amount of moisture, a fuel level, a data rate, etc.

The vehicle 104 includes a polarization camera sensor 102 capable of producing polarimetric images. A polarization camera sensor 102 may include a rotatable linear polarizer and/or multiple filters with fixed polarization angles. Additionally or alternatively, the vehicle 104 may include a polarimetric imaging radar sensor 102 or a polarimetric lidar sensor 102. A distribution of light waves that are uniformly vibrating in more than one direction is referred to as unpolarized light. Polarized light waves are light waves in which vibrations occur in a single plane. In some examples, polarized light waves may vibrate in multiple planes, e.g., at a first plane with 45 degrees of polarization and a second plane at 90 degrees of polarization. Polarization of light (or a light beam) may be specified with a degree of polarization and a direction of polarization. Further, a polarization of light may additionally or alternatively be specified by Stokes parameters, which include an intensity I, a degree of polarization DOP, an angle of polarization AOP, and shape parameters of a polarization ellipse. The process of transforming unpolarized light into polarized light is known as polarization. The direction of polarization is defined to be a direction parallel to an electromagnetic field of the light wave. A direction of polarization (i.e., a direction of vibration) may be specified with an angle of polarization between 0 and 360 degrees. Unpolarized light includes many light waves (or rays) having random polarization directions, e.g., sunlight, moonlight, fluorescent light, vehicle 104 headlights, etc. Light reflected from a a surface, e.g., a wet road surface, may include polarized light waves of varying degrees depending on the interaction of the light waves with the surface, as discussed below. The direction of polarization in such cases would tend to be aligned with the orientation of the surface normal from which the light reflected (providing useful information on surface structure the sensor 102 is imaging). Properties of return light signals include intensity, light field, wavelength(s), polarization, etc. A material may vary in how it reflects light, and a material with a wet surface may differ in its reflectance properties compared to a dry surface.

Light can be polarized by passage through or reflectance by a polarizing filter or other polarizing material, e.g., atmospheric scattering. A degree of polarization is a quantity used to describe the portion of an electromagnetic wave that is polarized. A perfectly polarized wave has a degree of polarization DOP (or polarization degree) of 100% (i.e., restricting light waves to one direction), whereas an unpolarized wave has a degree of polarization of 0% (i.e., no restriction with respect to a direction of vibration of a light wave). For example, laser light emissions generally are fully (100%) polarized. A partially polarized light wave can be represented by a combination of polarized and unpolarized components, thus having a polarization degree between 0 and 100%. A degree of polarization is calculated as a fraction of total power that is carried by the polarized component of the light wave. The computer 108 may be programmed to determine a degree of polarization for each pixel of a polarimetric image received from the camera sensor 102.

Figure 2:
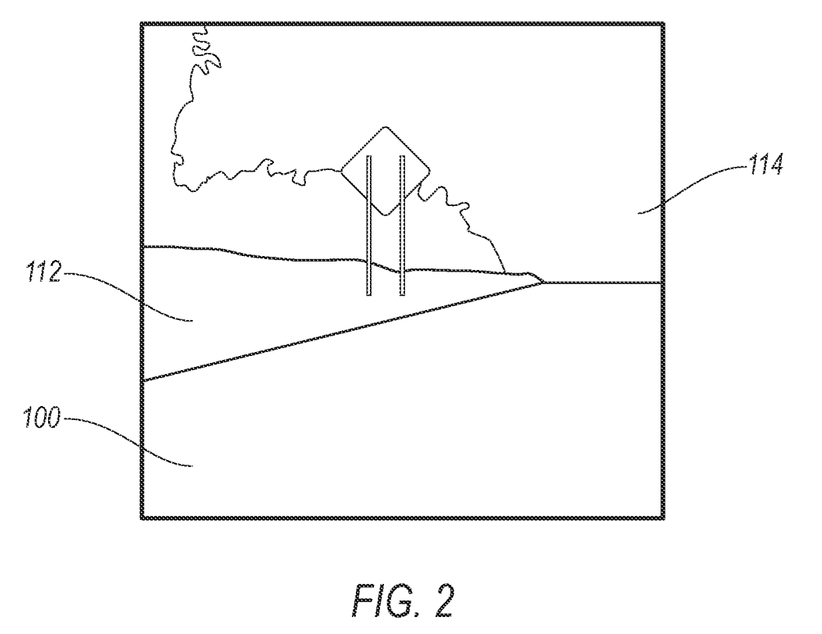
FIG. 2 shows example image data received from a camera sensor of the vehicle of FIG. 1.

A polarimetric image, in the present context, is an image received from a polarimetric 2D or 3D camera sensor 102. A polarimetric camera sensor 102 is a digital camera including optical and/or electronic components, e.g., an image sensing device 200, as shown in FIG. 2, configured to filter polarized light and detect the polarization of the received light. Other filtering methods may also be possible to create polarized image data. A polarimetric camera sensor 102 may determine a degree of polarization of received light in various polarization directions. Light has physical properties such as brightness (or amplitude), color (or wavelength), polarization direction, and a polarization degree. For example, unpolarized light may have a population of light waves uniformly distributed in various directions (i.e., having different directions) resulting in a "low" polarization degree (i.e., below a specified threshold) and fully polarized light may include light waves having one direction resulting in a "high" polarization degree (i.e., above a specified threshold). In the present context, a "low" polarization degree may be 0% to 10%, a medium polarization degree may be 10% to 90%, and a "high" polarization degree may be defined as 90% to 100%. Each of these physical properties may be determined by a polarimetric camera sensor 102. A polarimetric camera sensor 102, e.g., using a Polarized Filter Array (PFA), is an imaging device capable of analyzing the polarization state of light in the captured image. The polarimetric camera sensors 102 exhibit spatial variations, i.e. nonuniformity, in their response due to optical imperfections, e.g., introduced during a nanofabrication process. Calibration is performed by computational imaging algorithms to correct the data for radiometric and polarimetric errors.

A polarizing camera sensor 102 typically includes a lens (not shown) that focuses received light on an image sensing device. A polarizing image sensing device is an optoelectronic component that converts light to electrical signals such as a CCD or CMOS sensor 102, a radar sensor 102, a lidar sensor 102, etc. Image data output from an image sensing device typically includes a plurality of pixels, e.g. an array consisting of a million pixel elements also known as 1 megapixel Image data generated by the image sensing device for each image pixel may be based on image attributes including a polarization direction (or axis), polarization degree, an intensity, and/or a color space.

To filter detected polarized light, a polarizing material, e.g., in form of a film, may be placed on the image sensing device and/or may be included in the image sensing device. For example, to produce a polarizing film, tiny crystallites of iodoquinine sulfate, oriented in the same direction, may be embedded in a transparent polymeric film to prevent migration and reorientation of the crystals. As another example, Polarized Filter Array (PFA) may be used to produce polarizing films. PFAs may include metal wire grid microstructures, liquid crystals, waveplate array of silica glass, and/or intrinsically polarization-sensitive detectors.

The computer 108 may be programmed to determine an intensity, polarization direction, and degree of polarization, e.g., for each image pixel, based on data received from the camera sensor 102. The computer 108 may be programmed to generate a polarization map based on the received image data. The polarization map may include a set that includes an intensity (e.g., specified in candela), an angle of polarization (e.g., 0 to 360 degrees), and a degree of polarization (e.g., 0 to 100%), color, light intensity, etc., for each pixel of the polarimetric image.

A light beam striking a surface, e.g., a road 100, may be absorbed, diffused (or refracted) and/or reflected, as is known. Diffuse light reflection is a reflection of light or other waves or particles from a road 100 surface such that a light beam incident on the surface is scattered at many angles rather than at just one angle as in a case of specular reflection. Many common materials, e.g., upholstery, leather, fabric, vehicle paint, road surface, etc., exhibit a mixture of specular and diffuse reflections. Light striking a surface that is wet, e.g., a wet area 106, is substantially specularly reflected (i.e., reflected more at one angle than diffused among many angles compared to a same surface in dry condition which would diffuse more light than would be specularly reflected).

The actuators 110 may be implemented via circuits, chips, or other electronic components that can actuate various vehicle 104 subsystems in accordance with appropriate control signals as is known. The actuators 110 may be used to control braking, acceleration, and steering of the vehicle 104. Additionally or alternatively, an actuator 110, e.g., an electronic switch, may be used to turn on hazard lights. As an example, the vehicle 104 computer 108 may output control instructions to control the actuators 110.

The vehicle 104 may include a human-machine interface (HMI), e.g., one or more of a display, a touchscreen display, a microphone, a loudspeaker, etc. The user can provide input to devices such as the computer 108 via the HMI. The HMI can communicate with the computer 108 via the vehicle 104 network, e.g., the HMI can send a message including the user input provided via a touchscreen, microphone, a camera that captures a gesture, etc., to a computer 108, and/or can display output, e.g., via a screen, loudspeaker, etc., including data indicating a mirage alert, etc.

The computer 108 may be programmed to operate the vehicle 104 based on data received from vehicle 104 sensors 102, e.g., a forward-looking camera sensor 102 having a field of view including an exterior of the vehicle 104 such as road 100, road 100 shoulder 112, sky, etc. To operate the vehicle 104, the computer 108 may identify features within the field of view of the vehicle 104 camera sensor 102 and operate the vehicle 104 based on the detected features.

With reference to FIG. 2, the computer 108 may be programmed to detect feature(s) in the received image data and to classify the features, e.g., a road 100, shoulder 112, sky 114, etc., based on specified feature classes, as discussed with reference to example Table 1 below. The computer 108 may be programmed to detect features using an image processing algorithm, a neural network, etc., as discussed below.

Figure 3:
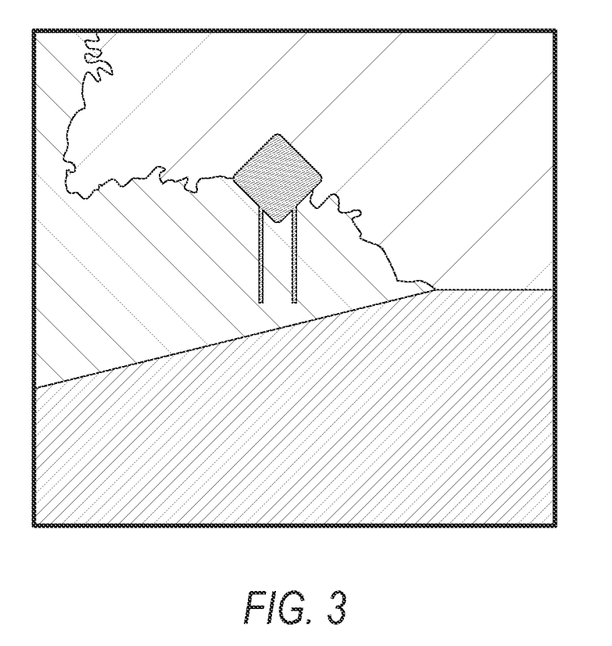
FIG. 3 shows semantic segmentation of the image shows in FIG. 2.

FIG. 3 is a visualization of results of feature classification superimposed on the example image. Additionally or alternatively, the computer 108 may be programmed to store the classification of the features of an image in any other suitable form, e.g., a table specifying a class for each pixel of the image. Additionally or alternatively, the computer 108 may be programmed to detect features based on other sensors 102 data, e.g., LIDAR sensor 102, a second camera sensor 102, etc.

TABLE 1

| Feature | Description |
| --- | --- |
| Building | single or multi-level structure, bridge, etc. |
| Pedestrian | Adult and/or child pedestrian |
| Vegetation | Tree, shrub, lawn, etc. |
| Vehicle | Truck, passenger car, train, motorbike, bike, etc. |
| Sky | Sky including clouds, stars, and/or objects in sky such as planes, birds, etc. |
| Road surface | Roads such as freeway, highway, street, etc. |
| Signage | Traffic signs, e.g., speed limit, no entry sign, etc. |

In the present context, "features" in an image include points, lines, edges, corners, and/or other geometric or non-geometric objects or features found in an image. Non-limiting examples of a feature include vegetation, hill, mountain, vehicle, building, guardrail, road, road shoulder, building, pedestrian, animal, etc. These features may be specified according to pre-determined features, e.g. Haar-like features, histogram of oriented gradients, wavelet features, scale-invariant feature transform, etc. Alternatively or additionally, the features may be learned based a labeled data set where a machine learning algorithm, e.g. a neural network, is trained such that the weights and bias of the network are adjusted through backpropagation to reduce the prediction error or commonly known as the loss of the network's prediction. The features are divided into classes in accordance to shape, appearance, etc. Table 1 shows an example set of feature classes which may be identified by the computer 108 based on received image data from one or more camera sensors 102.

In the present context, "segmentation" (or semantic segmentation) includes an image processing technique to classify the features in an image. The computer 108 may be programmed to associate a class to each one or more of points (or pixels) of the image. In one example, the computer 108 may be programmed to perform the segmentation of the image data based on an output of a neural network trained to detect multiple feature classes including at least an occlusion class. An occlusion class, in the present context, may include rain, fog, insects, etc.

A "neural network" (NN) is a computing system implemented in software and/or hardware that is inspired by biological neural networks. A neural network learns to perform tasks by studying examples generally without being programmed with any task-specific rules. A neural network can be a software program that can be loaded in memory and executed by a processor included in a computer 108, for example, the computer 108. The neural network can include n input nodes, each accepting a set of inputs i (i.e., each set of inputs i can include one or more inputs x). The neural network can include m output nodes (where m and n may be, but typically are not, a same number) provide sets of outputs o1 . . . om. A neural network typically includes a plurality of layers, including a number of hidden layers, each layer including one or more nodes. The nodes are sometimes referred to as artificial neurons because they are designed to emulate biological, e.g., human, neurons. Additionally or alternatively, a neural network may have various architectures, layers, etc. such as are known.

For example, a neural network may learn to classify features in an image by analyzing training data, e.g., ground truth image data with predetermined classifications. For example, the ground truth data may include images that are classified in a lab, e.g., based on determinations made by a reference algorithm, a user, etc. For example, the neural network may be trained to classify classes of features occlusion, such as raindrop, fog, etc. based on inputted ground truth images. A ground truth image may include additional meta data specifying location coordinates x″, y″ of a feature such as raindrop. Additionally or alternatively, other machine learning techniques, such as SVM (Support Vector Machine), decision trees, naïve Bayes, ensemble methods, etc. may be implemented to classify the features that are extracted from (or detected) in the received image data. Additionally or alternatively, the neural network may be trained to determine a class and/or sub-class associated with a set of pixels (or super pixels or stixels) determined in the image. As is conventionally understood, a super pixel is a set of pixels that may be tracked by an image processing algorithm over multiple image frames, e.g., to determine a speed, location, direction, etc., of a moving vehicle 104, a pedestrian, etc.

A problem may arise in identifying one or more feature classes based on the received image data. For example, with reference to FIG. 4, a mirage phenomenon 124 on the road 100 may result in misdetection or a low confidence in identifying an area 106 with the mirage phenomenon 124 as belonging to a road surface class.

Figure 5:
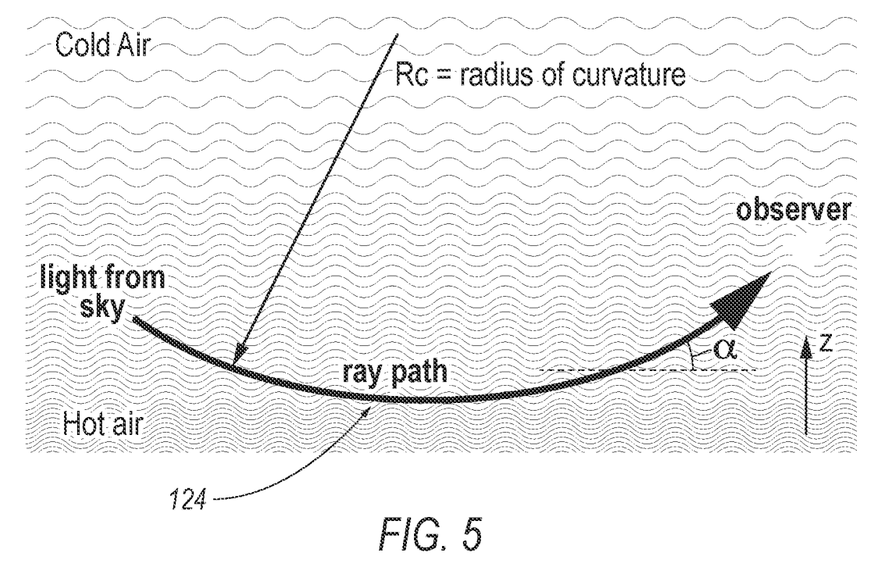
FIG. 5 is a diagram illustrating a mirage phenomenon.

With reference to FIG. 5, a mirage is a naturally occurring optical phenomenon in which light rays bend to produce a displaced image of sky. This phenomenon typically occurs on hot road 100 surfaces producing a displaced image of the sky which may be mistaken as water. Mirage phenomenon can also occur on a cold road surface, although with a lower thermal gradient magnitude compared to a hot road 100 surface. Air currents can cause an apparent rippling of the distortion which can further resemble features of water on the surface of the road 100. For example, a lidar and radar sensor 102 may not detect a return signal, or a position of light interaction in space may differ from that of nominal operation due to mirage phenomenon.

With reference to FIGS. 1-5, the computer 108 can be programmed to identify, in a vehicle sensor 102 field of view, environment features (e.g., using semantic segmentation techniques) including a sky, a road surface, a road shoulder 112, based on map data and data received from the one or more vehicle sensors 102, upon determining a low confidence in identifying an area 106 of the field of view to be a road 100 surface or sky, to receive a polarimetric image. As discussed below, the computer 108 can be programmed to determine, based on the received polarimetric image, whether the identified area 106 is a mirage phenomenon 124, a wet road surface, or the sky.

Confidence, in the present context, is a measure that specifies a likelihood of correct identification, e.g., 0 (no confidence) to 100 (full confidence). The computer 108 may be programmed to determine a confidence level for an identified class in a received image. The confidence may be determined based on an output of an image processing algorithm, e.g., an object detection algorithm, etc., or a neural network trained to identify the feature classes, e.g., based on semantic segmentation techniques. In one example, the computer 108 may determine a low confidence in identifying a feature class of an area 106 upon determining a confidence level less than a confidence threshold, e.g., 50%. The computer 108 can be programmed to identify the features at least in part based on map data, e.g., HD map data identifying features in a surrounding area 106 of the vehicle 104. Thus, the computer 108 may be programmed to identify the features based on semantic segmentation of image data, the received map data, and location of the vehicle 104. In one example, the computer 108 may be programmed to determine the confidence level based on whether identification of a feature based on map data and image data match. In this context, a "match" or "matching features" means a feature identifier of a location in the map identifies a same feature identified for that location in image data, e.g., a point identified in image data as road surface is located on a road surface based on the received map data. For example, the computer 108 may be programmed to determine a high confidence, e.g., 80%, upon determining that image data and map data identify a point to be on a road 100 surface, and determine a low confidence, e.g., 30%, upon determining based on map data that a point is on the road 100 whereas determining based on image data that the point is in the sky. In another example, the computer 108 may be programmed to identify features in the image based on an image processing technique and neural network based semantic segmentation, and to determine a low-confidence for an area 106 of the image upon determining that an output of the image processing for the area 106 does not match an output of semantic segmentation for the respective area 106.

Figure 6:
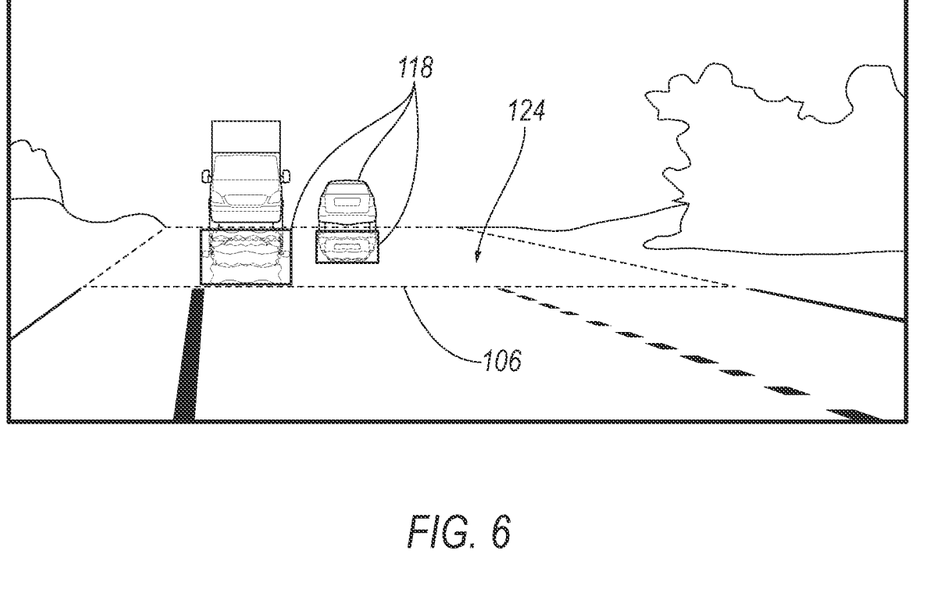
FIG. 6 shows another example of a low-confidence area in an image.

Additionally or alternatively, with reference to FIG. 6, a low confidence area can be determined upon determining that a road 100 surface has a vanishing edge, a road 100 lane marker is missing, and/or that an anomalous object 118 is present. As shown in FIG. 6, an anomalous object 118 may be a reflection of a vehicle 104 (sometimes called a "mirrored vehicle") or an object with a distorted shape. A mirrored vehicle is a reflection of a vehicle 104 on the surface of the road 100 caused by mirage phenomenon 124. A distorted shape of, e.g., a vehicle 104, may be caused by a curved path of light resulting from a mirage phenomenon 124.

The computer 108 may be programmed to determine the mirage phenomenon 124 upon determining at least one of (i) the area 106 of the field of view, based on semantic segmentation, to be a sky portion 114, (ii) the area 106, based on image features, to be a road 100 surface, (iii) the area 106, based on localization based on map data and vehicle 104 sensor 102 data, to be a road 100 surface, (iv) the area 106, based on the received polarimetric image, to be a sky portion 114, or (v) a probability of an atmospheric condition causing a mirage phenomenon 124 that exceeds a probability threshold.

The computer 108 may be programmed to determine the mirage phenomenon 124 based on environmental conditions including a temperature and an atmospheric condition. For example, the computer 108 may estimate a ground surface temperature on the road 100 surface based on-vehicle temperature sensing, atmospheric temperatures based on weather station information, solar illuminance, sensor wavelength, road surface absorption, wind speed, and air pressure via a combination of—data from the vehicle sensors 102 and connected vehicle data (e.g. weather station information). From this information, an empirical model of the index of refraction above and along the road 100 surface may be generated. This further may be combined with knowledge of the vehicle sensor 102 in space, the nominal light ray direction in space, and the road 100 surface topography. Thereafter a path of the beam can be determined usage Snell's law. If we assume a linear variation of index of refraction we can model as the shape of a parabola in which we may determine if the light path intersects with the road 100 surface (imaging road) or does not intersect with the road surface or any other object and continues upwards onto the skydome. We may alternatively perform a piecewise analysis (e.g. piecewise integration) to update for any variation in the index of refraction as a function of height and distance. The results of this prediction may be compared to sensor image 102 data include road surface features, mirage mirroring features, polarization properties of the image, etc. to validate or augment our prior prediction. For example, in a particular pixel with a particular nominal ray, the path of the light ray may be predicted to intersect the road 100 surface but the properties of the pixel indicates that the light ray's path is an estimated position on the skydome one or more parameters of the empirical model may be adjust to achieve validation. More specifically in the case of linear variation of the index of refraction above the surface that is constant as a function of distance from the vehicle, one may adjust the index of refraction ratio to result in a change in the shape of a parabola that agrees with both the image features and within the confidence interval of the index of refraction ratio estimate based on atmospheric properties.

A prior calculation may be used to correct images (e.g. dewarp images) or adjust the 3D position of point cloud data from stereo imaging, imaging radar or lidar. In those methods, there is typically an assumption of the propagation direction of light to and from the lens or optics of the sensor where the ray of light maintains a constant path. Consequently, the sensor 102 may provide distance information that can determine the other two dimensions in space. In cases of active illumination, the parabola path of the illumination may be used to determine the occlusion zone.

As discussed above, upon determining a low-confidence area 106 in the received image data, the computer 108 may be programmed to receive a polarimetric image. As shown in Table 2, upon detecting a high degree of polarization and a direction of polarization indicating a direction of polarization from a wet surface, the computer 108 may be programmed to determine, based on the received polarimetric image (i) a road surface upon detecting a low to moderate degree of polarization and a direction of polarization matching a road surface polarization direction (i.e., direction of polarization of light reflected from a road surface), (ii) a sky portion 114 upon detecting a low degree of polarization and a direction of polarization matching a skydome prediction of sky, or (iii) a water area 126 based on a high degree of polarization and a direction of polarization matching water direction of polarization. Skydome prediction of sky, in the present context, is an estimation of degree of polarization and polarization angle of pixels in the received image that cover a portion of sky. Various techniques may be used to determine a skydome prediction. For example, a remote computer may receive polarimetric images of the sky, to determine Stokes vector for each pixel of the received image that covers entire sky, and to determine the degree of polarization and polarization angle of the pixels based on the determined Stokes vector.

TABLE 2

| Degree of Polarization | Direction of Polarization | Polarimetric Prediction (Output) |
| --- | --- | --- |
| Low-Moderate | Matches direction of polarization of light reflected from road surface | Road |
| Matches sky dome prediction, low | Matches sky dome prediction | Sky |
| High | Matches direction of polarization of light | Water |

TABLE 2-continued

| Degree of Polarization | Direction of Polarization | Polarimetric Prediction (Output) |
| --- | --- | --- |
| | reflected from a wet road surface | |

Figure 4:
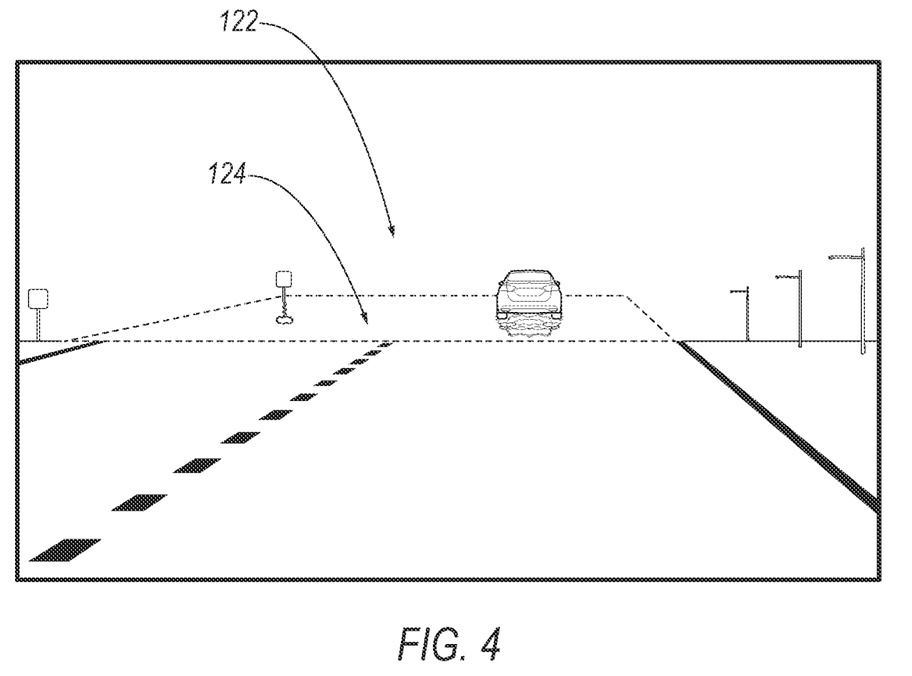
FIG. 4 shows an example image with a low-confidence area.

With reference to FIGS. 4-6, the computer 108 may be programmed to determine an occluded volume 122 in the field of view upon detecting the mirage phenomenon 124, and to actuate a vehicle 104 actuator 110 based on the determined occluded volume 122. An occluded area 106 may be a volume above the road 100 having a bottom surface on the road 100 at a location of the mirage phenomenon 124. Due to the mirage phenomenon 124 the computer 108 may be unable to detect objects on the road 100 in the occluded area 106 or beyond the occluded area 106. Thus, the computer 108 may be programmed to actuate a vehicle actuator 110 based on a distance of the vehicle 104 to the occluded volume 122. For example, the computer 108 may be programmed to actuate a vehicle 104 propulsion actuator 110 to reduce a vehicle 104 speed to a speed below a threshold, e.g., 75 kilometers per hour (kph) upon determining a distance of less than 50 meters (m) to the detected occluded area 106. Additionally or alternatively, the computer 108 may store data, e.g., in form of Table 3, specifying a maximum vehicle 104 speed based on a distance of the vehicle 104 to the occluded area 106.

TABLE 3

| Distance to occluded area 106 (m) | Maximum vehicle 104 speed (kph) |
| --- | --- |
| 25 | 50 |
| 50 | 75 |
| 75 | 100 |

A high degree of polarization and a direction of polarization indicating a direction of polarization of light reflected from a wet road surface may be a result of a wet road surface (i.e., no mirage phenomenon 124), e.g., due to rain, flooding, spillage of liquid from a vehicle 104, etc. For example, the computer 108 may be programmed to determine a water area 126 upon detecting a high degree of polarization and a direction of polarization of light reflected from a wet road surface while an outside temperature is below a temperature threshold, and to actuate a vehicle actuator 110 based on the determined water area 126. A vehicle 104 operation, e.g., driver assistance operation, may be adjusted based on knowledge of water location. For example, the computer 108 may be programmed, upon determining the water area 126 on a vehicle path 128, to actuate the vehicle 104 actuator 110 based on a distance of the vehicle 104 to the water area 126. In one example, the computer 108 may actuate vehicle propulsion and/or braking actuators 110 to reduce the vehicle 104 speed to 50 kph upon determining that the vehicle 104 moves on a wet area 106.

Figure 7:
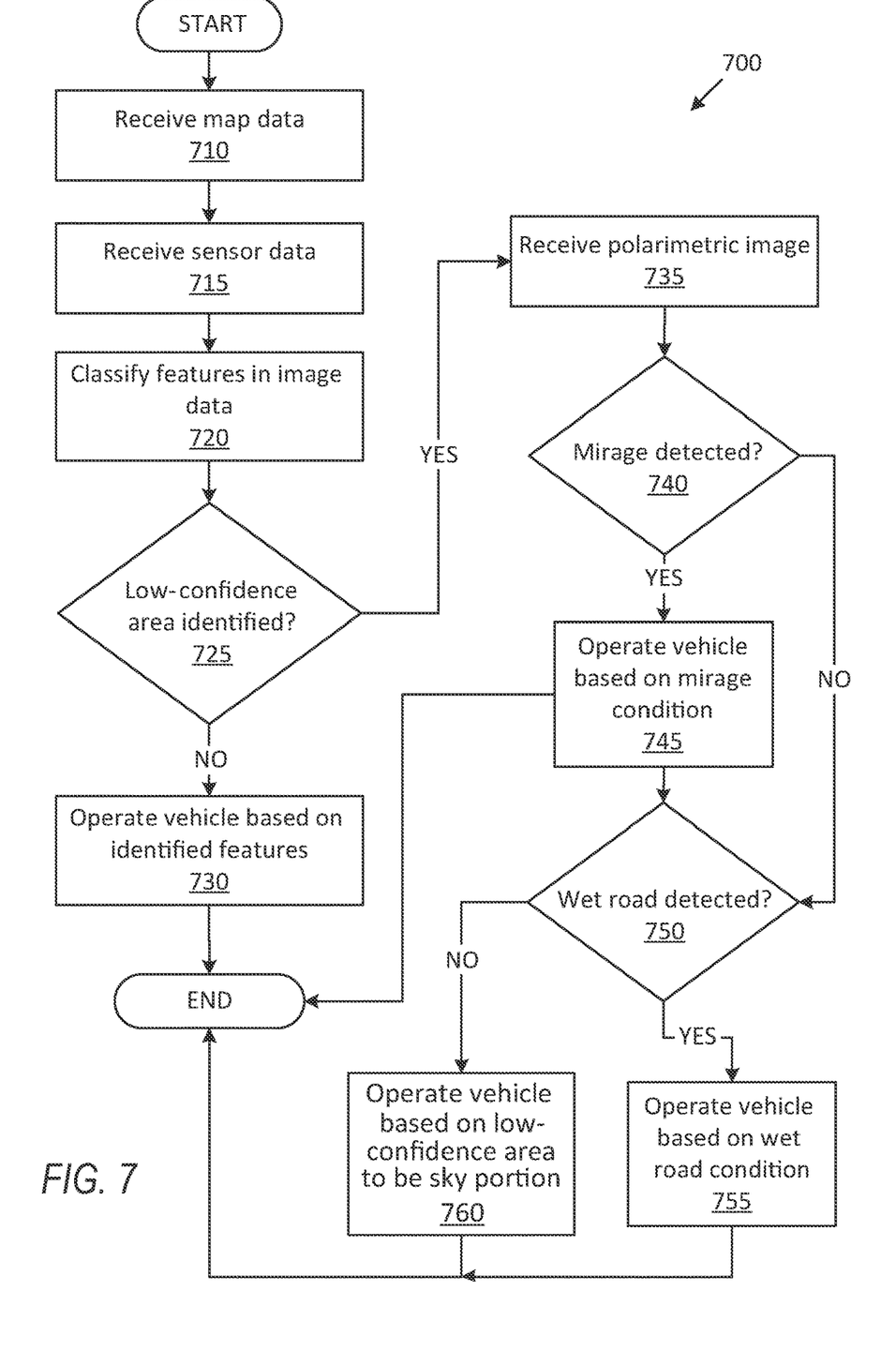
FIG. 7 is a flowchart of an example process for operating the vehicle.

FIG. 7 shows an example flowchart of a process 700 for operating a vehicle 104 computer 108. The computer 108 may be programmed to execute blocks of the process 700.

The process 700 begins in a block 710, in which the computer 108 receives map data. Map data may include data specifying a feature corresponding to a location, e.g., specifying road 100 edges or boundaries, lanes, etc., such that the computer 108 can determine whether a location coordinate is on a road surface, shoulder 112, etc.

Next, in a block 715, the computer 108 receives sensor 102 data. The computer 108 may receive image data from vehicle sensors 102 such as a camera sensor 102, point cloud data from a lidar sensor 102, temperature data from a temperature sensor 102, etc. The computer 108 may be further programmed to receive environmental or atmospheric data from vehicle sensors 102 and/or a remote computer 108, e.g., via wireless communications, including an exterior temperature, barometric pressure, etc.

Next, in a block 720, the computer 108 classifies features in the received image data. The computer 108 may be programmed to detect a feature, e.g., as listed in example Table 1, using image processing techniques. The computer 108 may be programmed to perform semantic segmentation, as discussed with respect to FIG. 3, to identify various features in the received image data. The computer 108 may be programmed to determine sky, road 100 surface, road 100 shoulder 112, etc., based on semantic segmentation. Thus, in one example, the computer 108 may be programmed to identify a first set of features in the received image data based on image processing technique and a second set of features in the received image data based on semantic segmentation.

Next, in a decision block 725, the computer 108 determines whether one or more low-confidence areas 106 are detected in the received image. As discussed with respect to FIGS. 4-6, the computer 108 may be programmed to determine an area 106 as a low-confidence area 106 using various techniques, e.g., by detecting horizon, vanishing point, missing lines, anomalous objects, etc., and/or when an output of an image processing for an area 106 does not match map data, and/or output of image processing technique does not match output of semantic segmentation for the respective area 106, etc. A vanishing point is a point on the image plane of a perspective drawing where the two-dimensional perspective projections (or drawings) of mutually parallel lines in three-dimensional space appear to converge. If the computer 108 identifies one or more low-confidence areas 106 in the received image data, then the process proceeds to a block 735, otherwise the process 700 proceeds to a block 730.

In the block 730, the computer 108 operates the vehicle 104 based on identified features in the image data. The computer 108 may be programmed to operate vehicle 104 actuators 110 to actuate vehicle 104 propulsion, braking, and/or steering based on detected features, e.g., road 100, objects, etc. For example, the computer 108 may actuate a vehicle 104 brake actuator 110 upon determining a distance to an object, e.g., a pedestrian, a car, etc., on a vehicle path 128 is less than a distance threshold.

Following the block 730, the process 700 ends, or alternatively, could return to the block 710, although not shown in FIG. 7.

In the block 735, the computer 108 receives a polarimetric image from a polarimetric camera sensor 102 having a field of view overlapping the field of view of the vehicle 104 camera sensor 102 providing the image with the identified low-confidence area(s) 106. In one example, the computer 108 may be programmed to actuate the polarimetric camera sensor 102 to provide the polarimetric image.

Following the block 735, in a decision block 740, the computer 108 determines whether a mirage phenomenon 124 is detected based on the image data, the polarimetric image, map data, etc. The computer 108 may be programmed to determine that the detected low-confidence area 106 is a mirage phenomenon 124 upon determining that (i) the low-confidence area 106, based on semantic segmentation, to be a sky portion 114, (ii) the low-confidence area 106, based on image features, to be a road surface, (iii) the low-confidence area 106, based on map data, to be a road surface, and (iv) the area 106, based on the received polarimetric image, to be a sky portion 114. In one example, the computer 108 may be further programmed to determine the mirage phenomenon upon additionally determining that a probability of atmospheric condition for mirage phenomenon 124 exceeds a probability threshold. If the computer 108 determines that a mirage-phenomenon is detected, then the process 700 proceeds to a block 745; otherwise the process 700 proceeds to a decision block 750.

In the block 745, the computer 108 operates the vehicle 104 based on the detected mirage phenomenon 124. The computer 108 may determine an occluded volume 122 based on the detected mirage phenomenon 124 and actuate vehicle actuators 110 based on the determined occluded volume 122. For example, the computer 108 may be programmed to operate the vehicle 104 as illustrated by exemplary Table 2. The computer 108 may be programmed to correct 2D or 3D sensor 102 data to account for deflection of light rays in a vicinity of the mirage phenomenon 124.

In the decision block 750, the computer 108 determines whether the identified low-confidence area 106 is a wet area 106. The computer 108 may be programmed to determine the low-confidence area 106 to be a wet area 106 upon determining based on the polarimetric image that the low-confidence area 106 is a wet area 106, e.g., covered with water or any other liquid. As discussed above, the computer 108 may be programmed to identify a wet area 106 upon determining a high degree of polarization and a direction of polarization matching a direction of polarization caused by wet surfaces. If the computer 108 determines that the low-confidence area 106 is a wet area 106, then the process 700 proceeds to a block 755; otherwise the process 700 proceeds to a block 760.

In the block 755, the computer 108 operates the vehicle 104 based on wet road 100 condition. In one example, the vehicle 104 may be programmed to reduce the speed of the vehicle 104 to a maximum speed of 50 kph upon determining that the vehicle 104 moves on a wet road 100 surface.

In the block 760, the computer 108 operates the vehicle 104 based on determining that the low-confidence area 106 is a sky portion 114. Thus, the computer 108 may be programmed to operate the vehicle 104 based on determined vehicle path 128 and planned vehicle 104 speed.

Following the block 755 and 760, the process 700 ends, or alternatively returns to the block 710.

Use of "in response to," "based on," and "upon determining" herein indicates a causal relationship, not merely a temporal relationship.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™ C, C++, Visual Basic, Java Script, Perl, Python, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system for detecting a road surface in a vehicle, comprising a processor and a memory, the memory storing instructions executable by the processor to:
    identify, from a non-polarimetric image including a vehicle sensor field of view, environment features including a sky, a road surface, and/or a road shoulder, based on map data and data received from the one or more vehicle sensors;
    receive a polarimetric image based on determining a confidence, that measures a likelihood that one of the environment features in an area of the field of view in the non-polarimetric image is correctly identified, is below a confidence threshold and is therefore a low confidence;
    determine, based on the received polarimetric image, whether the identified area is a mirage phenomenon, a wet road surface, or the sky; and
    based on the low confidence that the one of the environment features in the non-polarimetric image is correctly identified, operate the vehicle based on the polarimetric image in addition to the non-polarimetric image;
    wherein the low confidence is determined upon determining that a road surface has a vanishing edge, a road lane marker is missing, or an anomalous object is present.

2. The system of claim 1, wherein the instructions further include instructions to determine the mirage phenomenon based on environmental conditions including a temperature and an atmospheric condition.

3. The system of claim 1, wherein the instructions further include instructions to identify the environment features using semantic segmentation of the non-polarimetric image.

4. The system of claim 1, wherein the anomalous object includes at least one of a mirrored vehicle or an object with a distorted shape.

5. The system of claim 1, wherein the instructions further include instructions to determine the mirage phenomenon upon determining (i) the area of the field of view, based on semantic segmentation, to be a sky portion, (ii) the area, based on image features, to be a road surface, (iii) the area, based on localization based on map data and vehicle sensor data, to be a road surface, (iv) the area, based on the received polarimetric image, to be a sky portion, and (v) a probability of atmospheric condition for mirage phenomenon that exceeds a probability threshold.

6. The system of claim 1, wherein the instructions further include instructions to determine an occluded volume in the field of view upon detecting the mirage phenomenon, and actuate a vehicle actuator based on the determined occluded volume.

7. The system of claim 1, wherein the instructions further include instructions to determine, based on the received polarimetric image, at least one of: (i) a road surface upon detecting a low to moderate degree of polarization and a direction of polarization matching a road surface polarization direction, (ii) a sky portion upon detecting a low degree of polarization and a direction of polarization matching a skydome prediction of sky, or (iii) a water area upon detecting a high degree of polarization and a direction of polarization matching water direction of polarization.

8. The system of claim 1, wherein the instructions further include instructions to determine a water area upon detecting a high degree of polarization and a direction of polarization matching water direction of polarization, and actuate a vehicle actuator based on the determined water area.

9. The system of claim 8, wherein the instructions further include instructions, upon determining the water area on a vehicle path, to actuate the vehicle actuator based on a distance of the vehicle to the water area.

10. A method, comprising:
    identifying, from a non-polarimetric image including a vehicle sensor field of view, environment features including a sky, a road surface, and/or a road shoulder, based on map data and data received from the one or more vehicle sensors;
    receiving a polarimetric image based on determining a confidence, that measures a likelihood that one of the environment features in an area of the field of view in the non-polarimetric image is correctly identified, is below a confidence threshold and is therefore a low confidence;
    determining, based on the received polarimetric image, whether the identified area is a mirage phenomenon, a wet road surface, or the sky; and based on the low confidence that the one of the environment features in the non-polarimetric image is correctly identified, operating the vehicle based on the polarimetric image in addition to the non-polarimetric image; wherein the low confidence is determined upon determining that a road surface has a vanishing edge, a road lane marker is missing, or an anomalous object is present.

11. The method of claim 10, further comprising determining the mirage phenomenon based on environmental conditions including a temperature and an atmospheric condition.

12. The method of claim 10, further comprising identifying the environment features using semantic segmentation of the non-polarimetric image.

13. The method of claim 10, wherein the anomalous object includes at least one of a mirrored vehicle or an object with a distorted shape.

14. The method of claim 10, further comprising determining the mirage phenomenon upon determining (i) the area of the field of view, based on semantic segmentation, to be a sky portion, (ii) the area, based on image features, to be a road surface, (iii) the area, based on localization based on map data and vehicle sensor data, to be a road surface, (iv) the area, based on the received polarimetric image, to be a sky portion, and (v) a probability of atmospheric condition for mirage phenomenon that exceeds a probability threshold.

15. The method of claim 10, further comprising determining an occluded volume in the field of view upon detecting the mirage phenomenon, and actuate a vehicle actuator based on the determined occluded volume.

16. The method of claim 15, further comprising determining, based on the received polarimetric image, at least one of: (i) a road surface upon detecting a low to moderate degree of polarization and a direction of polarization matching a road surface polarization direction, (ii) a sky portion upon detecting a low degree of polarization and a direction of polarization matching a skydome prediction of sky, or (iii) a water area upon detecting a high degree of polarization and a direction of polarization matching water direction of polarization.

17. The method of claim 10, further comprising determining a water area upon detecting a high degree of polarization and a direction of polarization matching water direction of polarization, and actuating a vehicle actuator based on the determined water area.

18. The method of claim 17, further comprising, upon determining the water area on a vehicle path, actuating the vehicle actuator based on a distance of the vehicle to the water area.

19. The system of claim 1, wherein the instructions further include instructions to determine an occluded volume based on the detected mirage phenomenon and operate the vehicle based on the determined occluded volume.

20. The system of claim 1, wherein the instructions further include instructions to, upon determining that no mirage condition is detected, operate the vehicle based on one of the wet road surface or the sky.

* * * * *